(12) United States Patent
Takahashi et al.

(10) Patent No.: US 11,065,603 B2
(45) Date of Patent: Jul. 20, 2021

(54) POROUS CARBON MATERIAL, METHOD FOR PRODUCING SAME, AND USE OF SAME

(71) Applicant: KURARAY CO., LTD., Kurashiki (JP)

(72) Inventors: Keita Takahashi, Okayama (JP);
Takayuki Yoshikawa, Okayama (JP);
Mitsunori Hitomi, Okayama (JP);
Takayuki Yamada, Okayama (JP)

(73) Assignee: KURARAY CO., LTD., Kurashiki (JP)

( * ) Notice: Subject to any disclaimer, the term of this patent is extended or adjusted under 35 U.S.C. 154(b) by 0 days.

(21) Appl. No.: 16/963,666

(22) PCT Filed: Dec. 20, 2019

(86) PCT No.: PCT/JP2019/050005
§ 371 (c)(1),
(2) Date: Jul. 21, 2020

(87) PCT Pub. No.: WO2020/137849
PCT Pub. Date: Jul. 2, 2020

(65) Prior Publication Data
US 2021/0046452 A1 Feb. 18, 2021

(30) Foreign Application Priority Data
Dec. 28, 2018 (JP) .............................. JP2018-246690

(51) Int. Cl.
*C01B 32/336* (2017.01)
*B01J 21/18* (2006.01)
*C01B 32/318* (2017.01)
*B01J 37/08* (2006.01)
*C02F 1/70* (2006.01)
*B01J 37/10* (2006.01)
*C02F 101/38* (2006.01)
*C02F 101/36* (2006.01)

(52) U.S. Cl.
CPC ............. *B01J 21/18* (2013.01); *B01J 37/084* (2013.01); *B01J 37/10* (2013.01); *C01B 32/318* (2017.08); *C01B 32/336* (2017.08); *C02F 1/70* (2013.01); *C01P 2002/82* (2013.01); *C01P 2006/80* (2013.01); *C02F 2101/36* (2013.01); *C02F 2101/38* (2013.01)

(58) Field of Classification Search
CPC ..... C01B 32/30; C01B 32/316; C01B 32/336; B01J 21/18; B01J 37/10; B01J 37/084
See application file for complete search history.

(56) References Cited

U.S. PATENT DOCUMENTS

| | | |
|---|---|---|
| 5,356,849 A | 10/1994 | Matviya et al. |
| 5,444,031 A | 8/1995 | Hayden |
| 5,464,605 A | 11/1995 | Hayden |
| 5,504,050 A | 4/1996 | Hayden |
| 5,603,867 A | 2/1997 | Ohsaki et al. |
| 5,972,834 A | 10/1999 | Ohsaki et al. |
| 10,333,145 B2* | 6/2019 | Pol ....................... H01M 4/9083 |
| 2003/0209497 A1 | 11/2003 | Baker et al. |
| 2003/0209498 A1 | 11/2003 | Baker et al. |
| 2004/0124152 A1 | 7/2004 | Baker |
| 2005/0167367 A1 | 8/2005 | Baker |
| 2013/0023405 A1 | 1/2013 | Hitomi et al. |
| 2014/0037536 A1 | 2/2014 | Reimerink-Schats et al. |
| 2015/0030527 A1* | 1/2015 | Gadkaree .............. C01B 32/336 423/460 |
| 2016/0133394 A1* | 5/2016 | Sakshaug ................ C01B 32/05 361/502 |
| 2016/0310929 A1* | 10/2016 | Mangarella .............. B01J 37/24 |
| 2019/0329235 A1 | 10/2019 | Takahashi et al. |

FOREIGN PATENT DOCUMENTS

| | | |
|---|---|---|
| CN | 1 156 974 A | 8/1997 |
| CN | 10346661613 | 11/2015 |
| CN | 106 672 963 B | 8/2018 |
| JP | 6-100311 A | 4/1994 |
| JP | 8-83736 A | 3/1996 |
| JP | 2685356 B2 | 8/1997 |
| JP | 2000-256999 A | 9/2000 |
| JP | 3955062 B2 | 5/2007 |
| JP | 2013-163629 A | 8/2013 |
| JP | 2014-506529 A | 3/2014 |
| KR | 10-20120132175 A | 12/2012 |
| WO | WO 94/016814 A1 | 8/1994 |
| WO | WO 2011/125504 A1 | 10/2011 |
| WO | WO 2018/116842 A1 | 6/2018 |

OTHER PUBLICATIONS

International Search Report issued Feb. 10, 2020 in PCT/JP2019/050005 filed Dec. 20, 2019, 2 pages.
Written Opinion dated Feb. 10, 2020, in PCT/JP2019/05005 (with English Translation).
Chinese Office Action dated Feb. 4, 2021 in Chinese Patent Application No. 201980013787.6 filed Dec. 20, 2019 (w/ an English Summary).
European Search Report dated Feb. 1, 2021 in Patent Application No. 19905143.4,, filed Dec. 20, 2019, 9 pages.
Korean Office Action dated Feb. 8, 2021 in Korean Patent Application No. 10-2020-7024353 filed Dec. 20, 2019, (w/ Computer generated English Translation).

\* cited by examiner

*Primary Examiner* — Richard M Rump
(74) *Attorney, Agent, or Firm* — Oblon, McClelland, Maier & Neustadt, L.L.P.

(57) ABSTRACT

One aspect of the present invention relates to a porous carbon material having a nitrogen content of 0.6 to 2.0% by mass, a G band half-value width of 51 to 60 cm$^{-1}$ and an R value of 1.08 to 1.40 measured in a Raman spectrum using a laser having a wavelength of 532 nm, and iodine adsorption performance of 1000 to 1500 mg/g.

10 Claims, No Drawings

POROUS CARBON MATERIAL, METHOD FOR PRODUCING SAME, AND USE OF SAME

TECHNICAL FIELD

The present invention relates to a porous carbon material which can be used as a decomposition catalyst, a method for producing the same, and a use of the same.

BACKGROUND ART

It is well known that a porous carbon material itself such as activated carbon acts as a decomposition catalyst. For example, it is known that activated carbon is useful for various oxidation reactions including oxidation of hydrogen sulfide and $SO_2$. Activated carbon has been observed as affecting such reactions and activated carbon as a catalyst only affects a reaction rate, so that the activated carbon itself hardly changes by the reaction.

Activated carbon produced from a raw material with a high nitrogen content effectively catalyzes a specific reaction such as decomposition of chloramine as compared with activated carbon produced from a raw material with a low nitrogen content. Likewise, it is also known that catalytic function of activated carbon increases when activated carbon produced from a raw material with a low nitrogen content is exposed to a nitrogen-containing compound such as ammonia at a high temperature. Recently, activated carbon with high catalytic activity has been produced by carbonizing a substance with high nitrogen content such as polyacrylonitrile and polyamide at a low temperature or a high temperature and activating (stimulating) the carbonized product. In either case, the activated carbon is produced by a heat treatment at a temperature exceeding 700° C. It is also known that it is advantageous to oxidize activated carbon produced from a raw material with low nitrogen content before or during exposure to a nitrogen-containing compound.

However, prior art methods of producing activated carbon with catalytic activity all have certain disadvantages, which causes limited overall usefulness and practicability. For example, nitrogen-rich raw materials such as polyacrylonitrile and polyamide are expensive and generate large amounts of cyanides and other toxic gases upon carbonization. For activated carbon obtained from a raw material with a low nitrogen content, an intense chemical post treatment is required in order to greatly change the catalytic ability. In doing so, desired catalytic activity is achieved at the expense of carbon yield, resulting in inevitably causing an expensive cost. Furthermore, in the chemically treating method, a large amount of toxic and dangerous chemicals such as nitric acid, sulfuric acid or ammonia is used, so that toxic and dangerous byproducts such as SOS, NON, and cyanides are remarkably produced in a large quantity.

In Patent Literature 1, a catalytically active carbonaceous char which rapidly decomposes hydrogen peroxide or the like has been reported. In this literature, a raw material is oxidized at a low temperature, exposed to a nitrogen-containing compound such as urea, heated at a high temperature in an inert atmosphere, activated at a high temperature in water vapor and/or carbon dioxide, and cooled in an inert atmosphere, thereby producing a carbonaceous char. Patent Literature 2 describes that activated carbon having catalytic activity can be produced by mixing and activating charcoal with one or two or more organic nitrogen-containing compounds.

However, in the method using a nitrogen-containing compound as described in Patent Literatures 1 and 2, a large amount of toxic and dangerous by-products such as $NO_x$ is produced.

Patent Literature 3 describes a method for producing activated carbon having catalytic activity using charcoal. This method involves the addition of ammonia to water vapor. Such addition of ammonia is undesirable from the viewpoint of both health and environment.

Patent Literature 4 describes a method for producing activated carbon using bituminous coal containing nitrogen. However, in this method, a heat treatment is performed at a relatively low temperature, so that the electrical conductivity of the activated carbon is low and sufficient catalytic performance may not be obtained. However, when a heat treatment is performed at a high temperature, there are also problems in producing apparatuses and costs.

An object of the present invention is to provide a porous carbon material which can be obtained without treatment with a nitrogen-containing compound and which can be used as an excellent decomposition catalyst for various compounds and substances, a method for producing the same, and a use of the same.

CITATION LIST

Patent Literature

Patent Literature 1: JP 2685356 B
Patent Literature 2: JP 2014-506529 A
Patent Literature 3: JP 3955062 B
Patent Literature 4: JP 2013-163629 A

SUMMARY OF INVENTION

As a result of intensive studies to solve the above-mentioned problems, the present inventors have found that when a porous carbon material containing a nitrogen content at a predetermined concentration or more and having a high degree of crystallinity obtained by a specific two-staged heat treatment is used as a decomposition catalyst, a material having very excellent chloramine decomposing ability can be obtained. The present invention has been completed by further studies based on these findings.

A porous carbon material according to one aspect of the present invention has a nitrogen content of 0.6 to 2.0% by mass, a G band half-value width of 51 to 60 $cm^{-1}$ and an R value of 1.08 to 1.40 measured in a Raman spectrum using a laser having a wavelength of 532 nm, and iodine adsorption performance of 1000 to 1500 mg/g.

DESCRIPTION OF EMBODIMENTS

Hereinafter, embodiments of the present invention will be described, but the present invention is not limited thereto.

<Porous Carbon Material and Decomposition Catalyst>

The porous carbon material of the present invention has the following features:

(a) a nitrogen content is 0.6 to 2.0% by mass;
(b) a G band half-value width and an R value measured in a Raman spectrum using a laser having a wavelength of 532 nm are 51 to 60 $cm^{-1}$ and 1.08 to 1.40, respectively; and
(c) iodine adsorption performance is 1000 to 1500 mg/g.

In the above configuration, the porous carbon material of the present invention exhibits high catalytic activity (particularly for chloramine) as a decomposition catalyst. The porous carbon material of the present invention retains high catalytic activity even when used repeatedly. Therefore, the porous carbon material of the present invention can be used as a decomposition catalyst for various compounds and substances, and is particularly suitable for decomposing chloramine.

Regarding the above-described physical properties (a), (b), and (c), it seems that the catalytic activity of the porous carbon material of the present embodiment is not involved in a single physical property but in a combination of these physical properties. Therefore, even if one of particularly the physical properties (a) to (c) is within the above range, if the other physical properties are out of the above range, the catalytic activity of the decomposition catalyst is lowered.

If the nitrogen content of the porous carbon material is too smaller than the above-described defined range, reaction sites having a catalytic function decrease, so that the decomposition performance is lowered. If the nitrogen content is large, the performance is improved. However, if the nitrogen content is too large, harmful gases such as NO generated during catalyst production are generated in large amounts, which is not preferable because there is a concern about health and environmental impact. Therefore, the nitrogen content of the porous carbon material in the present embodiment is 0.6 to 2.0% by mass. More preferably, it is 0.6 to 1.0% by mass.

In the porous carbon material, a G band half-value width and an R value measured in a Raman spectrum using a laser having a wavelength of 532 nm are 51 to 60 cm$^{-1}$ and 1.08 to 1.40, respectively. Regarding a method for measuring the Raman spectrum, measurement can be made by the method described in Examples to be described later.

The G band half-value width is related to the disorder of a graphite structure in the carbon material. If this value is smaller than the above range, the disorder of the graphite structure is small, and the edge of carbon is reduced, so that the catalytic performance is lowered. Meanwhile, if the value is too large, the amount of amorphous carbon increases, so that the catalytic performance is lowered. Therefore, the G band half-value width in the present embodiment is 51 to 60 cm$^{-1}$. The G band half-value width in the present embodiment is more preferably 51 to 59 cm$^{-1}$, and even more preferably 52 to 58 cm$^{-1}$.

The R value is related to the crystallinity of the carbon material. If the R value is smaller than the above-described range, the crystallinity is low, and the amount of amorphous carbon increases, so that the catalytic performance is lowered. Meanwhile, if the R value is too large, the excessive development of the graphite structure causes the edge of carbon to decrease, so that the catalytic performance is lowered. Therefore, the R value in the present embodiment is 1.08 to 1.40. The R value in the present embodiment is more preferably 1.08 to 1.35, and even more preferably 1.08 to 1.30.

When the iodine adsorption performance of the porous carbon material in the present embodiment is within the above-described specified range, a sufficient specific surface area can be obtained, so that excellent decomposition performance can be obtained. When the value of the iodine adsorption performance is smaller than the above range, a sufficient catalytic reaction field cannot be obtained, so that the performance is lowered. Meanwhile, if the upper limit of the iodine adsorption performance is too large, the yield of the decomposition catalyst decreases, which is not preferable from an economical viewpoint. Therefore, the iodine adsorption performance in the present embodiment is 1000 to 1500 mg/g. The iodine adsorption performance in the present embodiment is more preferably 1050 to 1450 mg/g, and even more preferably 1100 to 1400 mg/g. The iodine adsorption performance in the present specification refers to a value measured according to the activated carbon test method JIS K 1474 (2014).

For example, the porous carbon material of the present embodiment can be produced using plants (coconut shell, chaff, coffee grounds, wood, etc.), natural polymers (starch, cellulose, lignins, etc.), semisynthetic polymers (cellulose esters, cellulose ethers, lignin resins, etc.), synthetic polymers (phenolic resins, furan-based resins, epoxy resins, etc.), and carbonaceous materials such as natural minerals (bituminous substances, etc.) and the like as raw materials. These raw materials may be used alone or in combination of two or more. The preferred raw material may be a plant material such as wood, but it is particularly preferable to use a natural mineral as a raw material. Specific examples thereof include nitrogen- and iron-containing coals. For example, coal selected from coals such as peat, lignite, subbituminous coal, bituminous coal, semi-anthracite coal, and anthracite is preferably used. Among these, bituminous coal is preferable because of its large nitrogen content. However, the use of a raw material having a too high nitrogen content causes a large amount of harmful substances such as NO$_x$, so that there is a concern about health and environmental impact. Therefore, the nitrogen content of the natural mineral raw material is preferably 1.0 to 2.0% by mass, and more preferably 1.5 to 2.0% by mass.

The porous carbon material of the present embodiment is very useful particularly for decomposing chloramine.

The chloramine (chloroamine) in the present embodiment may be any of monochloroamine NH$_2$Cl, dichloroamine NHCl$_2$, and trichloroamine NCl$_3$. Typical chloramines commonly used for disinfecting tap water and the like are monochloroamine which has low volatility and high stability. Therefore, the remaining monochloroamine is treated with sodium thiosulfate or the like. The decomposition catalyst of the present invention efficiently decomposes such chloramine (monochloroamine or the like) to liberate chlorine.

In the present embodiment, a molded body and a decomposition catalyst containing the porous carbon material as described above are also included. The decomposition catalyst of the present embodiment is particularly useful for decomposing chloramine.

<Method for Producing Porous Carbon Material>

A method for producing the porous carbon material of the present embodiment as described above is not particularly limited, and for example, it can be produced by the following method.

That is, the porous carbon material of the present embodiment is obtained by carbonizing a carbonaceous material, activating the obtained carbonized product at a temperature of 800 to 900° C. (primary activation), and then activating the carbonized product further at a temperature of 900 to 980° C. (secondary activation).

First, the carbonaceous material can be selected from all known materials, and examples thereof include plants (coconut shell, chaff, coffee grounds, wood, and the like), natural polymers (starch, cellulose, lignins, and the like), semisynthetic polymers (cellulose esters, cellulose ethers, lignin resins, and the like), synthetic polymers (phenolic resins, furan-based resins, epoxy resins, and the like), and natural minerals (bituminous substances, and the like). These raw materials can be used alone or in combination of two or more. The preferred raw material may be a plant material such as wood, but it is particularly preferable to use a natural mineral as a raw material. Specific examples thereof include nitrogen- and iron-containing coals. For example, coal selected from coals such as peat, lignite, subbituminous coal, bituminous coal, semi-anthracite coal, and anthracite is preferably used. Among these, bituminous coal is preferable because of its large nitrogen content. However, the use of a raw material having a too high nitrogen content causes a large amount of harmful substances such as $NO_x$, so that there is a concern about health and environmental impact. Therefore, the nitrogen content of the natural mineral raw material is preferably 1.0 to 2.0% by mass, and more preferably 1.5 to 2.0% by mass.

The carbonaceous material of the present embodiment can be prepared using a fluidized bed, a multistage furnace, or a rotary furnace or the like which is a general activated carbon production facility.

Carbonization can be performed by a conventional method, for example, by heating a carbonaceous material at 400 to 800° C., preferably 500 to 800° C., and more preferably 600 to 800° C., while blocking oxygen or air.

In the present embodiment, the activation treatment is preferably performed in two stages (primary activation and secondary activation).

First, the primary activation is performed at a temperature of 800 to 900° C. If the temperature is low, it takes a long time to obtain the desired iodine adsorption performance, which is not preferable from the viewpoint of productivity. If the temperature is too high, the nitrogen content decreases, so that a carbon structure also tends to excessively develop, which is not preferable from the viewpoint of the catalytic performance. The heat treatment temperature in the primary activation is more preferably 850 to 900° C.

In the producing method of the present embodiment, the primary activation treatment can be performed by using a fluidized bed, a multistage furnace, or a rotary furnace or the like in the temperature range in an atmosphere of a mixed gas of water vapor, nitrogen, and carbon dioxide and the like. By activating the carbonized product in the atmosphere of the mixed gas, the carbonized product is partially gasified, to obtain a porous carbon material. In the primary activation treatment, gases other than the above-described gases may be contained, and for example, oxygen, argon, carbon monoxide, ammonia, and hydrogen and the like may be contained. The mixed gas for gasifying a part of the carbonized product of the carbonaceous material can be also obtained by burning other combustible materials containing natural gas, petroleum, or hydrocarbon. The activation temperature is typically varied in the range of about ±25° C. in many cases.

The activation time of the primary activation is not particularly limited, but it may be about 1 to 48 hours, preferably about 4 to 24 hours, and more preferably about 5 to 20 hours (for example, 6 to 12 hours). If the activation time is too short, the decomposition catalytic activity of the porous carbon material may be lowered. If the activation time is too long, the productivity may be lowered.

A gas partial pressure is also not particularly limited, but a partial pressure during gas supply is set such that a water vapor pressure is about 5 to 40%, and preferably about 10 to 30%; a carbon dioxide partial pressure is about 10 to 50%, and preferably about 10 to 40%; and a nitrogen partial pressure is about 30 to 80%, and preferably about 40 to 80%. The gas partial pressure may be set such that, for example, a water vapor pressure is about 10 to 40%; a carbon dioxide partial pressure is about 10 to 40%, and a nitrogen partial pressure is about 40 to 80%. The gas total pressure is typically 1 atm (about 0.1 MPa).

Air may be introduced into the furnace together with the mixed gas. In that case, the gas partial pressure when oxygen is wholly consumed may be in the above range.

A total gas supply amount (flow rate) in the primary activation treatment is about 0.1 to 50 L/min, and preferably about 0.1 to 20 L/min, based on 100 g of the raw material of a carbonized product. If the flow rate is too low, the activation is not sufficient, and if it is too high, the decomposition catalytic activity of the porous carbon material is lowered.

Next, the secondary activation is performed, but before that, an acid-washing treatment may be performed. In particular, when the porous carbon material of the present embodiment is used for a water purification use, it is preferable to perform an acidic treatment from the viewpoint of suppressing metal elution. It is also preferable to perform the acid-washing treatment from the viewpoint of being capable of further improving the iodine adsorption performance during a secondary activation treatment to be described later. As an acid used for the acid-washing treatment, hydrochloric acid, nitric acid, and sulfuric acid and the like can be used, and among them, hydrochloric acid is preferable. When the acid-washing treatment is performed, the porous carbon material after the acid-washing treatment is preferably subjected to water washing or the like for a deoxidation treatment.

In the secondary activation, a heat treatment is performed in a temperature range slightly higher than that of the primary activation treatment, that is, in a temperature range of 900 to 980° C. When the heat treatment temperature is low, the development of the carbon structure is not sufficient, which is not preferable from the viewpoint of the catalytic performance. Meanwhile, if the temperature is much higher than the above range, the nitrogen content decreases, so that the carbon structure also tends to excessively develop, which is not preferable from the viewpoint of the catalytic performance. The temperature range is more preferably 920 to 970° C., and even more preferably 920 to 960° C.

The activation time of the secondary activation is not particularly limited, but it may be about 0.5 to 24 hours, preferably about 0.5 to 12 hours, and more preferably about 1 to 6 hours (for example, 2 to 6 hours). If the activation time is too short, the development of the carbon structure may be not sufficient, and the decomposition catalytic activity of the porous carbon material may be lowered. If the activation time is too long, the productivity may be lowered.

The secondary activation treatment can be performed in the same manner as in the primary activation, by using a fluidized bed, a multistage furnace, or a rotary furnace or the like in the above temperature range in an atmosphere of a mixed gas of water vapor, nitrogen and carbon dioxide and the like. The mixed gas may contain gases other than the above-described gases in the same manner as in the primary activation treatment. For example, the mixed gas may contain oxygen, argon, carbon monoxide, ammonia, and hydrogen and the like. The mixed gas to be used may be obtained by burning other combustible materials containing natural gas, petroleum, or hydrocarbon.

A gas partial pressure is not particularly limited, but the partial pressure during gas supply is set such that a water vapor partial pressure is about 0 to 30%, and preferably about 0 to 20%; a carbon dioxide partial pressure is about 0 to 50%, and preferably about 10 to 40%; and a nitrogen partial pressure is about 30 to 100%, and preferably about 40 to 90%. In particular, it is preferable that the carbon dioxide partial pressure is 10 to 50%, and the nitrogen partial pressure is 50 to 90%. The gas total pressure is typically 1 atm (about 0.1 MPa). If the water vapor pressure is too high, the nitrogen content tends to decrease, which is not preferable from the viewpoint of the catalytic performance.

Air may be introduced into the furnace together with the mixed gas. In that case, the gas partial pressure when oxygen is wholly consumed may be in the above range.

The total gas supply amount (flow rate) in the secondary activation treatment is preferably about 0.1 to 20 L/min, more preferably about 0.1 to 10 L/min, and particularly preferably about 1 to 5 L/min, based on 100 g of the raw material of the primary activation product. If the flow rate is too large, the Raman spectrum physical properties (the development of the carbon structure) are not sufficient, so that the catalytic performance may be insufficient. If the flow rate is too low, a sufficient activation treatment cannot be performed, which is not preferable from the viewpoint of productivity.

The reaction gas supply amount in the secondary activation treatment is preferably about 0.1 to 5 L/min, more preferably about 0.1 to 4 L/min, and particularly preferably about 0.1 to 3 L/min, based on 100 g of the primary activation product. Here, the reaction gas means a gas which can gasify a part of a carbonized product of a carbonaceous material such as water vapor, carbon dioxide, oxygen, or ammonia.

By combining the above-described conditions, it is considered that a porous carbon material having a desired nitrogen content and physical properties can be obtained. For the details of the method for producing the porous carbon material of the present embodiment, reference may be made to Examples to be described later.

The porous carbon material obtained by the production method of the present embodiment may be in the form of powder, particulates, or granules and may be molded into a honeycomb form and the like as needed.

<Method for Producing Porous Carbon Material-Containing Molded Body>

Next, a method for producing a molded body containing the porous carbon material of the present embodiment (hereinafter referred to as a porous carbon material-containing molded body) will be described. The porous carbon material-containing molded body of the present embodiment can be obtained by a production method including a slurry preparation step of preparing a slurry by dispersing a mixture obtained by mixing a particulate or powdery porous carbon material and a fibrous binder in water, a suction filtration step of filtering the slurry under suction to obtain a preform, and a drying step of drying the preform to obtain a dried molded body.

(Slurry Preparation Step)

In the slurry preparation step, a granular or powdered porous carbon material and a fibrous binder are dispersed in water so that a slurry having a solid content concentration of 0.1 to 10% by mass (particularly 1 to 5% by mass) is prepared. If the solid content concentration of the slurry is too high, the dispersion is apt to be nonuniform, so that mottles are apt to occur in the molded body. Meanwhile, if the solid content concentration is too low, not only the molding time is prolonged and the productivity is lowered, but also the density of the molded body is increased and clogging due to capturing turbid components is apt to occur.

(Suction Filtration Step)

In the suction filtration step, a forming mold having many holes is placed in the slurry, and shaping is carried out by filtering the slurry while sucking from the inside of the mold. As a mold for forming, for example, a conventional mold can be utilized, and for example, the mold described in FIG. 1 of JP 3516811 B and the like can be used. As a suction method, a conventional method, for example, a suction method using a suction pump and the like can be utilized. After suction filtration, a step of adjusting the shape of the outer surface may be performed by compressing a preform on a shaping table.

(Drying Step)

In the drying step, the preform obtained in the suction filtration step is removed from the mold and dried with a dryer or the like to be able to obtain a molded body. The drying temperature is, for example, about 100 to 150° C. (particularly about 110 to 130° C.), and the drying time is, for example, about 4 to 24 hours (particularly 8 to 16 hours). If the drying temperature is too high, degeneration or melting of the fibrous binder occurs, so that the molded body is apt to have low filtration performance or low strength. If the drying temperature is too low, the drying time is apt to be prolonged, or the drying is apt to become insufficient. A step of grinding (or polishing) the outer surface of the dried molded body may be performed.

The porous carbon material-containing molded body of the present embodiment is used as, for example, a water purification filter or an artificial dialysis filter or the like. In the case of using the porous carbon material-containing molded body of the present embodiment as a water purification filter or an artificial dialysis filter, it is preferable to make such molded body into a cylindrical shape. Furthermore, as needed, a cap may be attached to a cylindrical top portion of the cylinder; a reinforcing material such as a NETLON pipe, a ceramic filter, or a nonwoven fabric or the like may be inserted into the cylindrical hollow portion; or a nonwoven fabric may be attached to the surface. By making the molded body into a cylindrical shape, the water flow resistance can be lowered. Furthermore, when filling the molded body in the housing for use as a cartridge, it is possible to easily load and replace the cartridge in a water purifier.

<Removal Method of Chloramine and the Like>

By using the porous carbon material of the present embodiment as a decomposition catalyst, chloramine can be decomposed and removed. That is, the present invention includes a method in which chloramine is decomposed and removed from an object by bringing a porous carbon material used as a decomposition catalyst into contact with the object.

The object as used herein is not particularly limited as long as it is a substance from which chloramine and the like is desired to be removed or it includes various media containing chloramine and the like. Examples thereof include water, flowing water, and mist containing chloramine and the like. Among these, the porous carbon material of the present embodiment is suitable for removing chloramine and the like from an object composed of a liquid medium such as water and flowing water.

The decomposition of a substrate such as chloramine can be performed in an aqueous solvent, and the decomposition reaction is performed in the presence of an excess amount of solvent in many cases. The concentration of the substrate such as chloramine is not particularly limited. If the porous carbon material of the present embodiment is used, the substrate can be effectively decomposed or oxidized. Thus, the porous carbon material of the present invention is useful for removing a trace amount of substrate such as chloramine (monochloroamine and the like). In the case of treating the remaining trace amount of substrate, for example, the substrate concentration may be about 0.1 ppb to 1000 ppm.

The amount of the porous carbon material used as a decomposition catalyst is not particularly limited, but it may be about 0.1 to 500 parts by mass, preferably about 1 to 250 parts by mass, and more preferably about 5 to 100 parts by mass (for example, 10 to 50 parts by mass), per 100 parts by mass of a substrate such as chloramine.

The decomposition (removal) reaction can be performed at, for example, about 10 to 70° C., and preferably about 20 to 50° C. The decomposition reaction can be performed, for example, in air or an oxygen-containing atmosphere, or in an inert gas atmosphere.

In particular, the porous carbon material of the present embodiment is very useful as a catalyst for decomposing chloramine, whereby, for example, the porous carbon material exhibits excellent effects in uses such as decomposition removal of chloramine contained in tap water. Therefore, the porous carbon material of the present embodiment is very useful as a decomposition catalyst, for example, for a water purifier or an industrial wastewater treatment.

As described above, the present specification discloses techniques of various aspects, among which main techniques are summarized below.

A porous carbon material according to one aspect of the present invention has a nitrogen content of 0.6 to 2.0% by mass, a G band half-value width of 51 to 60 $cm^{-1}$ and an R value of 1.08 to 1.40 measured in a Raman spectrum using a laser having a wavelength of 532 nm, and iodine adsorption performance of 1000 to 1500 mg/g.

With such a constitution, the porous carbon material of the present invention exhibits high catalytic activity (particularly for chloramine) as a decomposition catalyst and retains high catalytic activity even when used repeatedly. Therefore, the porous carbon material of the present invention is effective as a decomposition catalyst for various compounds and substances.

Furthermore, a molded body according to another aspect of the present invention contains the above-described porous carbon material. The molded body has a high catalytic activity, whereby it can be suitably used, for example, as a water purification filter and the like.

Furthermore, a decomposition catalyst according to another aspect of the present invention contains the above-described porous carbon material. The decomposition catalyst is preferably a decomposition catalyst for chloramine. Thereby, it is considered that a more excellent effect can be exhibited.

A method for producing a porous carbon material according to a further aspect of the present invention comprises: carbonizing a carbonaceous material to produce a carbonized product, activating the carbonized product at a temperature of 800 to 900° C., and then activating the carbonized product further at a temperature of 900 to 980° C.

In the method for producing a porous carbon material, it is preferable that the carbonaceous material is made of a natural mineral raw material. Furthermore, it is preferable that the natural mineral raw material has a nitrogen content of 1.0 to 2.0% by mass. Thereby, it is considered that adverse effects on health and environment can be further suppressed.

A method for decomposing and removing chloramine according to a further aspect of the present invention decomposes and removes chloramine from an object by bringing the above-described porous carbon material used as a decomposition catalyst into contact with the object.

Furthermore, the present invention also includes a decomposition catalyst device including the above-described molded body or decomposition catalyst.

EXAMPLES

Hereinafter, the present invention will be described in more detail based on Examples, but the following Examples do not limit the present invention at all.

In Examples and Comparative Examples (or Production Examples) to be described below, the decomposition catalytic performance of a porous carbon material was evaluated as follows.

[Measurement of Nitrogen Content of Porous Carbon Material]

A porous carbon material pulverized by using a high-speed sample pulverizer TI-100 manufactured by CMT until the 50% particle diameter (D50) of a volume-based cumulative distribution was set to about 5 to 10 μm was dried at 120° C. for 2 hours, and the nitrogen content of the porous carbon material was then measured by using Vario EL III manufactured by ELEMENTAR company using sulfanilic acid as a reference material. Three samples were analyzed for the test, and the average value thereof was taken as an analysis value.

The particle size of the pulverized porous carbon material was measured by a laser diffraction measurement method. That is, the porous carbon material to be measured was placed in ion exchange water together with a surfactant, subjected to ultrasonic vibration to prepare a homogeneous dispersion, and the dispersion was measured using Microtrac MT 3300 EX-II manufactured by MicrotracBEL Corp. "Polyoxyethylene (10) octylphenyl ether" manufactured by Wake Pure Chemical Industries, Ltd. was used as the surfactant. The analysis conditions are shown below.

(Analysis Conditions)
Number of measurements: 3 times
Measurement time: 30 seconds
Distribution representation: volume
Particle size division; standard
Calculation mode: MT 3000 II
Solvent name: WATER
Measurement upper limit: 2000 μm and measurement lower limit: 0.021 μm
Residual fraction ratio: 0.00
Passing fraction ratio: 0.00
Residual fraction ratio setting: invalid
Particle transmittance: absorption
Particle refractive index: N/A
Particle shape: N/A
Solvent refractive index: 1.333
DV value: 0.0100 to 0.0500
Transmittance (TR): 0.750 to 0.920

[Measurement of Raman Spectrum of Porous Carbon Material]

By the same method as that described in the above [Measurement of Nitrogen Content of Porous Carbon Material], the porous carbon material was pulverized to the same size. The pulverized porous carbon material was dried at 120° C. for 2 hours, and a Raman spectrum was then measured using RAMANforce manufactured by Nanophoton corp. using a light source with a laser wavelength of 532 nm. An area average spectrum of about 415×300 $μm^2$ was obtained. The measurement conditions are shown below.

(Measurement Conditions)
ND filter: 0.99%
Laser energy density: about 140 $W/cm^2$
Grating: 300 gr/mm
Slit width: 50 μm
Exposure time: 20 s (area irradiation)
Number of accumulation: 2 times A G band half-value width was measured for the spectrum obtained under the above measurement conditions according to the method described in JP 11-166894 A. That is, the obtained spectrum was subjected to peak fitting processing using a Gaussian function so as to provide a total of four peaks of a G-band peak derived from an amorphous phase (1530 to 1590 cm$^{-1}$), a G-band peak derived from a crystalline phase (1600 to 1620 cm$^{-1}$), a D-band peak derived from an amorphous phase (1230 to 1370 cm$^{-1}$), and a D-band peak (1340 to 1360 cm$^{-1}$) derived from a crystal phase, and the half-value width of the G-band peak derived from the crystal phase was then taken as a desired G band half-value width. The R value was taken as an intensity ratio $I_D/I_G$ (D band peak intensity/G band peak intensity) of the peaks of the D band (1340 cm$^{-1}$) and the G band (1600 cm$^{-1}$).

[Measurement of Iodine Adsorption Performance of Porous Carbon Material]

The iodine adsorption performance of the porous carbon material was measured according to the activated carbon test method JISK1474 (2014) in Japanese Industrial Standards.

[Decomposition Performance of Chloramine]

Using the porous carbon materials obtained in Examples and Comparative Examples, the decomposition amount of chloramine was measured as follows.

By the same method as that described in the above [Measurement of Nitrogen Content of Porous Carbon Material], the porous carbon material was pulverized to the same size. The pulverized porous carbon material was charged into 100 mL of an aqueous solution of chloramine (monochloroamine) adjusted to about 100 ppm while the addition amount was changed, and after shaking at 25° C. for 2 hours, the porous carbon material was filtered with a filter paper and a residual chloramine concentration of the filtrate was measured by the following DPD absorption photometric method. The relationship between the remaining chloramine concentration and the decomposition amount of chloramine (mg/g-porous carbon material) was determined, and the decomposition amount of chloramine (mg/g-porous carbon material) at a remaining concentration of 3 ppm was calculated and used for comparison. In the test, the case where the decomposition amount of chloramine (mg/g-porous carbon material) at a residual concentration of 3 ppm is 150 mg/g-porous carbon material is taken as acceptable. The "mg/g-porous carbon material" means an amount (mg) of chloramine to be decomposed per 1 g of the porous carbon material.

[Quantitative Determination Method of Chloramine: DPD Absorption Photometric Method]

(1) Measurement of Free Residual Chlorine 2.5 mL of a phosphate buffer solution was taken in a 50 mL colorimetric tube with a stopper, and 0.5 g of a N,N-diethyl-p-phenylenediamine (DPD) reagent was added to this buffer. Next, the filtrate was added to make a total volume 50 mL, and after admixture, an adequate amount of the colored test solution was taken in an absorption cell, and the absorbance at a wavelength in the vicinity of 510 to 555 nm was measured using a photoelectric spectrophotometer to determine a free residual chlorine (mg/L) in 1 L of the sample according to a calibration curve prepared in the following (2).

(2) Preparation of Calibration Curve of Free Residual Chlorine

An adjusted standard chlorine water was diluted with water to prepare a series of dilutions having several serial dilutions. Next, absorbance was measured immediately in the same manner as in the above (I) for each dilution, and the concentration (mg/L) of each free residual chlorine was determined. A calibration curve was prepared based on each absorbance obtained above.

(3) Measurement of Residual Chlorine

About 0.5 g of potassium iodide was added to and dissolved in the color-developed solution in the above (1). The resulting solution was left standing for about 2 minutes, and then measured in the same manner as in the above (1) to determine a residual chlorine (mg/L) of the sample.

(4) Measurement of Combined Residual Chlorine (Chloramine)

The difference between the residual chlorine and the free residual chlorine was measured as a combined residual chlorine (chloramine) concentration (mg/L).

Production Example 1

Bituminous coal as a carbonaceous raw material was carbonized at 650° C. to obtain a carbonized product. 600 g of the obtained carbonized product was charged into a furnace, and a mixed gas having a water vapor partial pressure of 15%, a carbon dioxide partial pressure of 11%, and a nitrogen partial pressure of 74% was supplied into the furnace at a total gas pressure of 1 atm and a flow rate of 80 L/min, followed by performing an activation treatment (primary activation) at 880° C. for 4 hours. The obtained activated product was washed in 1N hydrochloric acid, then desalted with ion-exchanged water, and then dried at 120° C. to obtain a raw material activated carbon A. The raw material activated carbon A had iodine adsorption performance of 1210 mg/g, a nitrogen content of 0.80% by mass, a G band half-value width of 48.68 cm', and an R value of 1.00.

Production Example 2

Bituminous coal as a carbonaceous raw material was carbonized at 650° C. to obtain a carbonized product 600 g of the obtained carbonized product was charged into a furnace, and a mixed gas having a water vapor pressure of 15%, a carbon dioxide partial pressure of 11%, and a nitrogen partial pressure of 74% was supplied into the furnace at a total gas pressure of 1 atm and a flow rate of 8.3 L/min, followed by performing an activation treatment (primary activation) at 850° C. for 20 hours. The obtained activated product was washed in 1N hydrochloric acid, then desalted with ion-exchanged water, and then dried at 120° C. to obtain a raw material activated carbon B. The raw material activated carbon B had iodine adsorption performance of 980 mg/g, a nitrogen content of 0.91% by mass, a G band half-value width of 52.33 cm$^{-1}$, and an R value of 1.02.

Production Example 3

600 g of coconut carbon obtained by carbonizing Philippine coconut shell was charged into a furnace, and a mixed gas having a water vapor pressure of 15%, a carbon dioxide partial pressure of 11%, and a nitrogen partial pressure of 74% was supplied into the furnace at a total gas pressure of 1 atm and a flow rate of 80 L/min, followed by performing an activation treatment (primary activation) at 880° C. for 2.5 hours. The obtained activated product was washed in 1N hydrochloric acid, then desalted with ion-exchanged water, and then dried at 120° C. to obtain a raw material activated carbon C. The raw material activated carbon C had iodine adsorption performance of 1260 mg/g, a nitrogen content of 0.29% by mass, a G band half-value width of 50.88 cm$^{-1}$, and an R value of 1.07.

Example 1

400 g of the raw material activated carbon A obtained in Production Example 1 was charged into a furnace, and a mixed gas having a water vapor pressure of 15%, a carbon dioxide partial pressure of 11%, and a nitrogen partial pressure of 74% was supplied into the furnace at a total gas pressure of 1 atm and a flow rate of 5.5 L/min (including a reaction gas supply amount of 1.4 L/min), followed by performing an activation treatment (secondary activation) at 950° C. for 3 hours.

Example 2

400 g of the raw material activated carbon A obtained in Production Example 1 was charged into a furnace, and a mixed gas having a water vapor pressure of 15%, a carbon dioxide partial pressure of 11%, and a nitrogen partial pressure of 74% was supplied into the furnace at a total gas pressure of 1 atm and a flow rate of 5.5 L/min (including a reaction gas supply amount of 1.4 L/min), followed by performing an activation treatment (secondary activation) at 950° C. for 6 hours.

Example 3

400 g of the raw material activated carbon B obtained in Production Example 2 was charged into a furnace, and a mixed gas having a water vapor pressure of 15%, a carbon dioxide partial pressure of 11%, and a nitrogen partial pressure of 74% was supplied into the furnace at a total gas pressure of 1 atm and a flow rate of 5.5 L/min (including a reaction gas supply amount of 1.4 L/min), followed by performing an activation treatment (secondary activation) at 950° C. for 2 hours.

Example 4

400 g of the raw material activated carbon B obtained in Production Example 2 was charged into a furnace, and a mixed gas having a water vapor pressure of 15%, a carbon dioxide partial pressure of 11%, and a nitrogen partial pressure of 74% was supplied into the furnace at a total gas pressure of 1 atm and a flow rate of 5.5 L/min (including a reaction gas supply amount of 1.4 L/min), followed by performing an activation treatment (secondary activation) at 950° C. for 6 hours.

Comparative Example 1

The raw material activated carbon A obtained in Production Example 1 was used as it was.

Comparative Example 2

80 g of the raw material activated carbon A obtained in Production Example 1 was charged into a furnace, and a mixed gas having a water vapor pressure of 15%, a carbon dioxide partial pressure of 11%, and a nitrogen partial pressure of 74% was supplied into the furnace at a total gas pressure of 1 atm and a flow rate of 21 L/min (including a reaction gas supply amount of 5.5 L/min), followed by performing an activation treatment (secondary activation) at 950° C. for 15 minutes.

Comparative Example 3

100 g of the raw material activated carbon A obtained in Production Example 1 was charged into a furnace, followed by performing a heat treatment at 1000° C. for 3 hours while blocking air.

Comparative Example 4

100 g of the raw material activated carbon A obtained in Production Example 1 was charged into a furnace, followed by performing a heat treatment at 1100° C. for 3 hours while blocking air.

Comparative Example 5

The raw material activated carbon B obtained in Production Example 2 was used.

Comparative Example 6

Bituminous coal as a carbonaceous raw material was carbonized at 650° C. to obtain a carbonized product, and the obtained carbonized product was then subjected to a heat treatment at 1100° C. while blocking air. Then, 400 g of the heat-treated product was charged into a furnace, and a mixed gas having a water vapor pressure of 15%, a carbon dioxide partial pressure of 11%, and a nitrogen partial pressure of 74% was supplied into the furnace at a total gas pressure of 1 atm and a flow rate of 5.5 L/min (including a reaction gas supply amount of 1.4 L/min), followed by treating the heat-treated product at an activation temperature of 900° C. so that iodine adsorption performance was set to 1150 mg/g, to prepare a porous carbon material.

Comparative Example 7

The raw material activated carbon C obtained in Production Example 3 was used as it was.

Comparative Example 8

400 g of the raw material activated carbon C obtained in Production Example 3 was charged into a furnace, and a mixed gas having a water vapor pressure of 15%, a carbon dioxide partial pressure of 11%, and a nitrogen partial pressure of 74% was supplied into the furnace at a total gas pressure of 1 atm and a flow rate of 5.5 L/min (including a reaction gas supply amount of 1.4 L/min), followed by performing an activation treatment (secondary activation) at 950° C. for 6 hours.

Comparative Example 9

Bituminous coal as a carbonaceous raw material was carbonized at 650° C. to obtain a carbonized product. 400 g of the obtained carbonized product was charged into a furnace, and a mixed gas having a water vapor pressure of 15%, a carbon dioxide partial pressure of 11%, and a nitrogen partial pressure of 74% was supplied into the furnace at a total gas pressure of 1 atm and a flow rate of 5.5 L/min (including a reaction gas supply amount of 1.4

L/min), followed by performing an activation treatment (primary activation) at 980° C. for 6 hours.

Comparative Example 10

Bituminous coal as a carbonaceous raw material was carbonized at 650° C. to obtain a carbonized product. 400 g of the obtained carbonized product was charged into a furnace, and a mixed gas having a water vapor pressure of 15%, a carbon dioxide partial pressure of 11%, and a nitrogen partial pressure of 74% was supplied into the furnace at a total gas pressure of 1 atm and a flow rate of 5.5 L/min (including a reaction gas supply amount of 1.4 L/min), followed by performing an activation treatment (primary activation) at 980° C. for 8.5 hours.

For the porous carbon materials obtained in Examples 1 to 4 and Comparative Examples 1 to 10, iodine adsorption performance, a nitrogen (N) content, a G band half-value width, an R value, and chloramine decomposition performance were measured and evaluated by the above-described test methods. The evaluation results are shown in Table 1 below.

TABLE 1

|  | Iodine adsorption performance mg/g | N content % | G band half-value width cm−1 | R value Id/Ig | Chloramine decomposition performance mg/g |
| --- | --- | --- | --- | --- | --- |
| Example 1 | 1280 | 0.71 | 52.10 | 1.16 | 197 |
| Example 2 | 1280 | 0.61 | 52.35 | 1.20 | 245 |
| Example 3 | 1070 | 0.87 | 53.20 | 1.09 | 182 |
| Example 4 | 1290 | 0.76 | 52.81 | 1.15 | 225 |
| Comparative example 1 | 1210 | 0.80 | 48.68 | 1.00 | 96 |
| Comparative example 2 | 1230 | 0.75 | 50.01 | 1.03 | 134 |
| Comparative example 3 | 1050 | 0.55 | 55.41 | 1.26 | 70 |
| Comparative example 4 | 1080 | 0.43 | 58.74 | 1.36 | 30 |
| Comparative example 5 | 980 | 0.91 | 52.33 | 1.02 | 61 |
| Comparative example 6 | 1150 | 0.83 | 53.45 | 1.07 | 137 |
| Comparative example 7 | 1260 | 0.29 | 50.88 | 1.07 | 29 |
| Comparative example 8 | 1520 | 0.34 | 52.52 | 1.22 | 72 |
| Comparative example 9 | 1020 | 0.52 | 52.93 | 1.22 | 59 |
| Comparative example 10 | 1240 | 0.48 | 53.12 | 1.25 | 57 |

As is clear from Table 1, in the porous carbon materials obtained in Comparative Examples 1 to 10, at least one physical property value of a nitrogen content, Raman spectrum physical properties (G band half-value width, R value), and iodine adsorption performance was excessive or too small with respect to a predetermined range of the present invention, so that sufficient chloramine decomposition performance could not be obtained.

Meanwhile, it was apparent that, in the porous carbon materials obtained in Examples 1 to 4, a nitrogen content, Raman spectrum physical properties (G band half-value width, R value), and iodine adsorption performance were within predetermined ranges, so that the porous carbon materials had very excellent chloramine decomposition performance.

It was also found from the present examples that the two-stage activation and the temperature range thereof are important in obtaining the porous carbon material in the present invention.

That is, in each of Examples in which the two-stage activation was performed in an appropriate temperature range, the amount of nitrogen was appropriate, and the development of crystals was also sufficient, so that a porous carbon material having excellent decomposition performance was obtained.

This application is based on Japanese Patent Application No. 2018-246690 filed on Dec. 28, 2018, the contents of which are included in the present application.

The present invention has been appropriately and sufficiently explained above by way of the embodiments while referring to the specific examples described above, for the purpose of illustrating the invention. A person skilled in the art should recognize, however, that the embodiments described above can be easily modified and/or improved. Therefore, it is understood that any modified embodiments or improved embodiments conducted by a person skilled in the art are encompassed within the scope as claimed in the appended claims, so long as these modifications and improvements do not depart from the scope of the claims.

INDUSTRIAL APPLICABILITY

A porous carbon material of the present invention is particularly useful as a decomposition catalyst for chloramine. In addition, high catalytic activity can be maintained, which achieves high recyclability and reduction in the amount of a decomposition catalyst waste product, to allow cost reduction.

The invention claimed is:

1. A porous carbon material comprising:
   a nitrogen content of 0.6 to 2.0% by mass;
   a G band half-value width of 51 to 60 $cm^{-1}$ and an R value of 1.08 to 1.40 measured in a Raman spectrum using a laser having a wavelength of 532 nm; and
   iodine adsorption performance of 1000 to 1500 mg/g.

2. A molded body comprising the porous carbon material according to claim 1.

3. A decomposition catalyst comprising the porous carbon material according to claim 1.

4. The decomposition catalyst according to claim 3, wherein the decomposition catalyst decomposes chloramine.

5. A method for producing the porous carbon material according to claim 1, the method comprising:
   carbonizing a carbonaceous material to produce a carbonized product;
   activating the carbonized product at a temperature of 800 to 900° C.; and then
   activating the carbonized product further at a temperature of 900 to 980° C.

6. The method according to claim 5, wherein the carbonaceous material is made of a natural mineral raw material.

7. The method according to claim 6, wherein the natural mineral raw material has a nitrogen content of 1.0 to 2.0% by mass.

8. A method for decomposing and removing chloramine from an object, the method comprising contacting the object with a decomposition catalyst comprising the porous carbon material according to claim 1.

9. A decomposition catalyst device comprising the molded body according to claim 2.

10. A decomposition catalyst device comprising the decomposition catalyst according to claim 3.

* * * * *